A. R. WHEAT.
ENDLESS TRACK STRUCTURE FOR TRACTORS.
APPLICATION FILED SEPT. 21, 1915.
1,186,721.
Patented June 13, 1916.
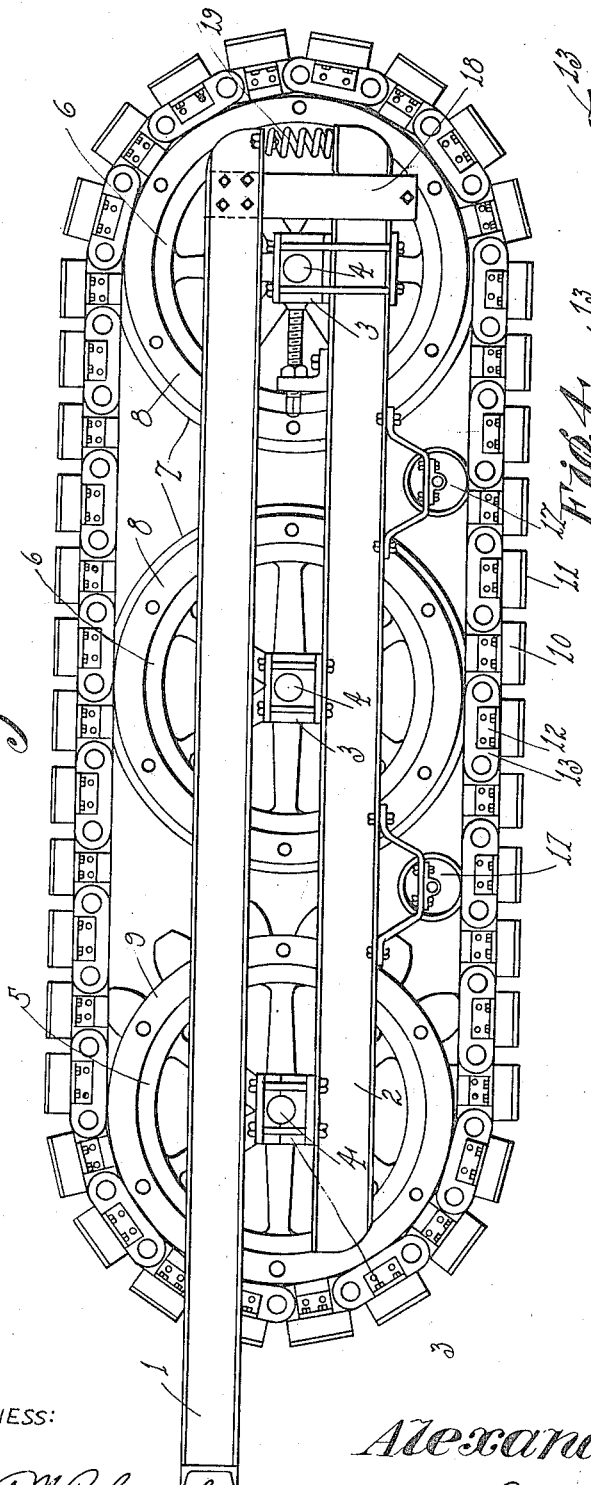
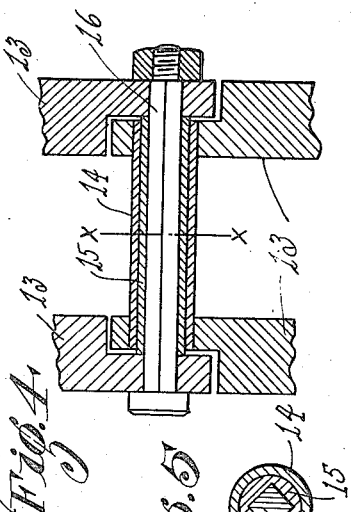
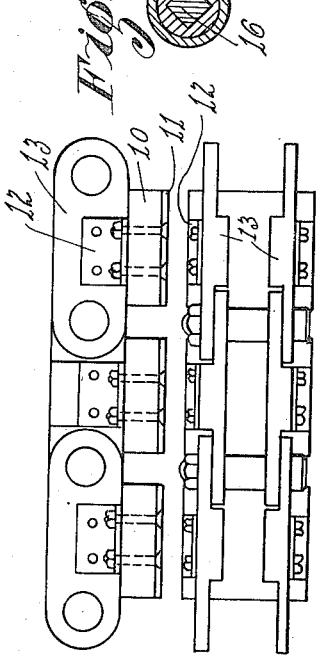
WITNESS:
INVENTOR.
Alexander R. Wheat
ATTORNEY.

UNITED STATES PATENT OFFICE.

ALEXANDER R. WHEAT, OF STOCKTON, CALIFORNIA.

ENDLESS-TRACK STRUCTURE FOR TRACTORS.

1,186,721.  Specification of Letters Patent.  Patented June 13, 1916.

Application filed September 21, 1915. Serial No. 51,766.

*To all whom it may concern:*

Be it known that I, ALEXANDER R. WHEAT, a citizen of the United States, residing at Stockton, in the county of San Joaquin, State of California, have invented certain new and useful Improvements in Endless-Track Structures for Tractors; and I do declare the following to be a clear, full, and exact description of the same, reference being had to the accompanying drawings, and to the characters of reference marked thereon, which form a part of this application.

This invention relates to improvements in platform drive wheels commonly used on the platform type of tractors, the object of the invention being to produce an improved structure for the platform sections of the wheel in combination with an improved form of driving and supporting wheels for the same, such structure being especially designed to allow such to perform its functions in the most efficient manner and with the least amount of frictional wear.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claims.

On the drawings, similar characters of reference indicate corresponding parts in the several views.

Figure 1 is a side elevation of the complete platform wheel structure. Fig. 2 is a side elevation of a part of the platform sections. Fig. 3 is a top plan view of the subject matter shown in Fig 2. Fig. 4 is a sectional view showing bearing member for the pivotal connections between the platform sections. Fig. 5 is a sectional view taken on a line X—X of Fig. 4.

Referring now more particularly to the characters of reference on the drawings, the numeral 1 designates a portion of the frame of a tractor to which the platform wheel will be attached.

The numeral 2 designates the auxiliary frame for the platform wheel structure which is pivotally connected at one end of the member 1 by means of bearings 3 turnably mounted on a cross shaft 4.

Mounted on the shaft 4 is a pair of sprocket wheels 5 and journaled on the frame 2 in advance of the sprocket wheels 5 are idling wheels 6. Each of the wheels 6 is comprised of a central rim 7 bolted to each side of which is an annular ring 8. The sprocket wheels 5, just at the base of their sprocket teeth, are likewise provided with annular rings 9 similar to the rings 8. The rings 8 and 9 are removably bolted to their adjacent parts so that when they become worn they can be readily removed and replaced without disturbing the balance of the wheel structure, said rings 9 forming the bearing surfaces for the endless track sections, as can readily be seen from Fig. 1. Each of the track sections is composed of a wooden block 10 having a metal face 11 bolted around or otherwise secured thereto, each block 10 being connected by a pair of angle irons 12 to a pair of links 13 spaced apart as shown to fit the teeth of the sprocket wheel 5 and over the members 7 and to bear against the rings 8 and 9. These links 13 are pivotally mounted with the links of the next adjacent section by means of a bearing structure consisting of the following structure, namely: A cylindrical sleeve 14 extends between the ends of one pair of the links 13 and a cylindrical sleeve 15 extends across from the adjacent ends of the next pair of links 13 within the sleeve 14. A square bolt 16 extends through the sleeve 15 and through the overlapping ends of the other pair of links 13. Thus, the sleeve 15 and the square bolt 16 and one pair of the links 13 move as a unit having the sleeve 14 as a bearing. In this manner, there is the least amount of frictional wear between the parts, and admission of dust, dirt and other deleterious matter to the bearings is obviated to a large degree. Mounted on the frame 2 between the sprocket wheel 5 and one of the wheels 6 and between the two wheels 6 are rollers 17 which bear against the track sections operating over the ground surface to prevent them from buckling up. The outer end of the frame 2 works through a guide 18 mounted on the frame 1 with a spring 19 interposed between the frame 2 and the frame 1 to compensate for the jolting and jarring at the outer end of the frame 2.

From the foregoing description it can be seen that I have produced a simple and effective endless track mechanism designed to facilitate the change of parts when wearing occurs and also one in which the frictional wear and tear is greatly reduced.

It will further be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention, as defined by the appended claims.

Having thus described my invention, what I claim as new and useful and desire to secure by Letters Patent, is:—

1. A device of the character described comprising the combination with a pivoted frame, of a drive wheel and idling wheels journaled on the frame, each of said wheels having removable annular rings on each side, an endless platform movable over said wheels, the inner edges of said platform being adapted to bear on said removable rings, as described.

2. A device of the character described comprising the combination with a pivoted frame carrying a drive wheel and idling wheels, an endless platform movable over such wheels, such platform being divided into sections, adjacent sections being pivotally mounted together, such pivotally mounted sections comprising a sleeve on the ends of one section, a sleeve disposed within said first named sleeve, and a square bolt projecting through the ends of the adjacent section and said second named sleeve, as described.

In testimony whereof I affix my signature in presence of two witnesses.

ALEXANDER R. WHEAT.

Witnesses:
   STEPHEN N. BLEWETT,
   FLOYD M. BLANCHARD.